United States Patent [19]
Takata et al.

[11] Patent Number: 5,996,269
[45] Date of Patent: *Dec. 7, 1999

[54] FISHING ROD HAVING A WATER DISPERSION SURFACE TO REDUCE DRAG ON FISHLINE

[75] Inventors: Nobuhiro Takata, Saitama; Shinichi Takeuchi, Tokyo; Masaru Akiba, Saitama, all of Japan

[73] Assignee: Daiwa Seiko, Inc., Tokyo, Japan

[*] Notice: This patent is subject to a terminal disclaimer.

[21] Appl. No.: 08/382,798

[22] Filed: Feb. 2, 1995

[30] Foreign Application Priority Data

Apr. 25, 1994 [JP] Japan ................................. 6-086243
Apr. 25, 1994 [JP] Japan ................................. 6-086244

[51] Int. Cl.⁶ ........................................... A01K 87/00
[52] U.S. Cl. ................................. 43/18.1; 43/24
[58] Field of Search ........................ 43/18.1, 24, 18.5

[56] References Cited

U.S. PATENT DOCUMENTS

| | | | |
|---|---|---|---|
| 1,595,275 | 8/1926 | White | 43/24 |
| 2,735,208 | 2/1956 | Bartletti | 43/24 |
| 3,088,239 | 5/1963 | Weaver | 43/18.1 |
| 3,513,582 | 5/1970 | Carabasse | 43/18.5 |
| 5,324,566 | 6/1994 | Ogawa et al. | 428/141 |
| 5,381,619 | 1/1995 | Watkins | 43/18.1 |
| 5,488,797 | 2/1996 | Akiba | 43/18.1 |

FOREIGN PATENT DOCUMENTS

| | | | |
|---|---|---|---|
| 5-268858 | 10/1993 | Japan . | |
| 5-276853 | 10/1993 | Japan | 43/18.1 |
| 1209513 | 10/1970 | United Kingdom . | |

OTHER PUBLICATIONS

"Nuts", The Sporting Goods Dealer, p. 91, Aug. 1966.

Primary Examiner—Kurt Rowan
Attorney, Agent, or Firm—Liniak, Berenato, Longacre & White

[57] ABSTRACT

The present disclosure concerns a fishing rod which reduces resistance between a fishline and a tubular member of the fishing, thereby allowing the fishline to be transported through the tubular member smoothly. The tubular member incorporates a diffusion property on its interior surface for spreading waterdrops into a thin film of water.

11 Claims, 2 Drawing Sheets

FISHING ROD HAVING A WATER DISPERSION SURFACE TO REDUCE DRAG ON FISHLINE

BACKGROUND OF THE INVENTION a) Field of the Invention

The invention concerns a fishing rod, in particular, an intra-line fishing rod which is structured such that a fishline can extend through a rod main body. The present invention also relates to a fishline.

A conventional intra-line fishing rod includes a fishing rod main body formed of a tubular member through which a fishline extends. On the other hand, an ordinary fishing rod includes fishline guides on the outside of a fishing rod main body through which a fishline passes. The intra-line fishing rod eliminates the possibility that the fishline can become tangled in the fishline guides, consequently operation of the intra-line fishing rod is improved over that of the ordinary fishing rod.

Conventional intra-line fishing rods have the disadvantage when winding a fishline out of the water the fishline brings drops of water inside the tubular member of the fishing rod main body. The waterdrops become attached to the interior surface of the fishing rod main body, consequently the fishline cannot be moved smoothly through the fishing rod main body due to the resistance of the waterdrops. Clearly, this impairs the operation of conventional intra-line fishing rods.

b) Description of Related Art

In order to address this problem, Japanese Unexamined Patent Publication No. Hei. 5-268858 discloses an intra-line fishing rod in which the interior surface of a tubular fishing rod main body includes thereon a resin layer containing fluoro-resin particles. Such an intra-line fishing rod improves the ability to repel water off the interior surface of the fishing rod main body by easing movement of waterdrops.

An intra-line fishing rod having the aforementioned resin layer facilitates movement of the waterdrops attached thereto, but cannot remove the waterdrops completely. Therefore, some of the waterdrops remain scattered on the interior surface. In this case, a "contact" angle $\theta$ between the interior surface and a line tangent to the exterior of a waterdrop (at the junction of the surface and the waterdrop) is in the range of 90° to 110°. Resistance to passage of the fishline through a fishing rod main body with waterdrops scattered on an interior surface having a resin layer is not always small when compared with a fishing rod that does not include the resin layer. Therefore, in conventional intra-line fishing rods, the fishline cannot be passed through the fishing rod main body to a satisfactory degree.

SUMMARY OF THE INVENTION

An object of the present invention is to eliminate the aforementioned disadvantage of conventional intra-line fishing rods. Accordingly, the present invention provides a fishing rod which reduces resistance to passage of a fishline through a fishing rod main body, thus enabling the fishline to pass smoothly through the fishing rod main body. Another object of the present invention is to provide a fishline which can be inserted and passed smoothly through a tubular fishing rod main body.

The present inventors have determined that the resistance of the water drops can be reduced by incorporating a diffusion property on the interior surface of a fishing rod main body, as opposed to a conventional fishing rod main body wherein the resistance of the waterdrops is reduced by applying a water repellent substance to the interior surface.

According to a first aspect of the present invention, a fishing rod is provided which includes a tubular member through which a fishline extends, and a diffusion property created on the interior surface of the tubular member.

According to a second aspect of the present invention, a fishline is provided which incorporates a diffusion property.

In the present invention, the term "diffusion" refers to the ability to spread water in a thin film. In particular, a diffusion property according to the present invention reduces the contact angle $\theta$ to 80° or less, and preferably 60° or less. The contact angle $\theta$ is illustrated in FIG. 5 between the water W and contact surface S.

In the first and second aspects of the present invention, the diffusion property may be obtained by concomitantly forming a diffusion layer on the interior surface of the tubular member or with the body of the fishline. Alternatively, a subsequent treatment may apply a diffusion layer to the interior surface of the tubular member or to the body of the fishline.

The diffusion property can be achieved by producing a thin metal layer according to a wet-type or dry-type plating method, and then oxidizing the surface of the thin metal layer to produce an oxidized metal layer. For example, a thin aluminum layer may be plated onto the interior surface of the tubular member or inside the fishline main body, with a subsequent Alumirite treatment oxidizing the aluminum layer.

The diffusion property can also be achieved by roughening the interior surface of the tubular member or inside the fishline main body to increase the surface area thereof. Examples of such roughening techniques include sand blasting, barrel polishing, honing, corona discharge, plasma or spark treatments, as well as chemical treatments using acid(s) or alkali(s).

Further, the diffusion property can be achieved by treating the interior surface of the tubular member or inside the body of the fishline with surface active agents. The diffusion property can yet further be achieved by creating a diffusion layer in addition to applying a diffusion treatment onto the surface of the layer.

The present inventors have also determined that the resistance to water drops can be reduced by using a stronger water repellent than is conventionally and generally used. That is, applying a super-repellent to the interior surface of the fishing rod body.

In particular, according to this third aspect of the present invention, there is provided a fishing rod which includes a tubular member through which a fishline can extend, and a super-repellent layer created on the interior surface of the tubular member.

According to a fourth aspect of the present invention, the body of a fishline includes a super-repellent layer formed thereon.

The term "super-repellent" used in the third and fourth aspects of the present invention refers to the property of a material which, when the material is wetted with water, does not allow the normal formation of waterdrops thereon but instead forms water balls which are easily removed, or allows only part of the water to remain thereon in the form of minute drops of water. In particular, a surf ace having a super-repellent property has a contact angle $\theta$ of 120° or greater, preferably in the range of 150° to 180°.

In the third and fourth aspects of the present invention, the super-repellent layer can be formed by a dispersed plating method in which metal such as nickel, nickel alloy, copper, copper alloy, tin, tin alloy or the like is used as mother material, and fluoride particles or fluoride fibers are dispersed in the mother material to produce a plating solution. In addition to fluoride particles or fluoride fibers, it is also possible to incorporate graphite fluoride particles, polytetrafluoroethylene fine particles, and the like having a mean molecular weight on the order of 8,000 to 10,000.

The super-repellent property can be achieved when the proportion of fluorine atoms in a layer exceed approximately 20%, with respect to the total number of atoms existing in the layer. The super-repellent layer may also be formed by a method in which the fluorine atoms exist on the surface of the layer in relatively larger numbers. Examples of such methods include a first method in which epoxy resin or acryl-urethane resin are mixed with minute particles (having a particle diameter on the order of 1 $\mu$m or less) then a thin coating (having a thickness on the order of 10 $\mu$m) is allowed to dry, and a second method in which tape including a base member having an adhesive layer and the above-mentioned epoxy resin or acryl-urethane resin uniformly attached onto the tape base member are bonded onto the interior surface of the tubular member or onto the body of the fishline, after which only the tape base member is removed.

The thickness of the diffusion property or super-repellent property of the tubular member in the fishing rod according to the first and third aspects is preferably as large as possible to take into account wear resistance (preferably, in the range of 10 to several hundred $\mu$m). If the thickness of the diffusion property of the tubular member is less than 10 $\mu$m, then a sufficient diffusion or super-repellent effect cannot be obtained. On the other hand, the thickness of the diffusion or super-repellent property of the fishline according to the second and fourth aspects is preferably in the range 1 to several $\mu$m. If the thickness of the diffusion or super-repellent property of the fishline is less than 1 $\mu$m, then it is not likely the layer will be able to perform its diffusion or super-repellent function to a sufficient degree. Additionally, If the thickness is in the range of several tens of $\mu$m, then the weight of the fishline becomes too heavy.

Suitable materials for the tubular member of a fishing rod main body include a mixture of reinforcing fiber such as carbon fiber, glass fiber, aramid fiber, alumina fiber or the like within the matrix of a thermosetting resin such as an epoxy resin or a thermoplastic resin (e.g. polyether-ether ketone resin or polyether-imide resin). Forming the tubular member may also include heating and pressurizing the above-mentioned materials until hardened.

Although the first and third aspects of the present invention have been described with respect to an intra-line fishing rod in which the tubular member is used as the fishing rod main body, the present invention is also applicable to fishing rod guide members attached to the outside of the fishing rod main body. The guide members may be formed of synthetic resin, metal or ceramics.

Materials for the body of the fishline, according to the second and fourth aspects of the present invention include polyamide resin such as nylon, polyethylene resin, polyether resin or the like.

Inherently, using the fishing rod according to the first or third aspect in combination with the fishline according to the second or fourth aspect, the fishline can be transported with respect to the fishing rod even more smoothly.

The fishing rod according to the present invention comprises a hollow tubular member with a fishline extending therethrough and a diffusion property formed on the interior surface of the tubular member.

The diffusion property on the interior surface of the tubular member causes drops of water brought inside the tubular member by a fishline to be spread as a thin film on the interior surface. This reduces the number of waterdrops inside the tubular member. That is, the diffusion property increases the cross-section area inside the tubular member which avoids contact between the fishline and any waterdrops. Therefore, as the fishline passes through the tubular member, it is difficult for any waterdrops to become attached to the fishline.

Also, when the fishline contacts the interior surface of the tubular member, the fishline passes through a thin film of water. There is less resistance between the fishline and the film than between the fishline and waterdrops scattered throughout the inside of the tubular member.

Consequently, the fishline can be transported through the fishing rod main body smoothly so as to improve the operation of the fishing rod.

The fishline according to the present invention comprises a diffusion property provided with the fishline.

The diffusion property created for the fishline according to the present invention readily spreads drops of water into a thin film. For this reason, as in the above-mentioned cases, it is possible to increase the cross-section area inside the tubular member which allows the fishline to extend without contact with any waterdrops. Also, even if the fishline contacts the interior surface of the tubular member, the resistance therebetween is reduced due to the thin water film formed on the surface of the fishline. Further, when the fishline extends inside the tubular member, the thin film of water attached to the fishline prevents the fishline from adhering to the interior surface of the tubular member.

As a result of the present invention, the fishline can be payed out and taken up smoothly.

The fishing rod according to the present invention comprises a hollow tubular member allowing a fishline to extend therethrough and a super-repellent layer formed on the interior surface of the tubular member.

The super-repellent layer on the interior surface of the tubular member causes drops of water brought inside the tubular member by a fishline to form big water balls which are easily removed from the tubular member. This means it is possible to remove the waterdrops that are the cause of the resistance on the fishline. As a result of this, the fishline can be extended through the fishing rod main body smoothly thereby improving the operation of the fishing rod.

The fishline according to the present invention comprises a fishline and a super-repellent layer formed thereon.

The super-repellent layer on the fishline according to the present invention ensures drops of water are prevented from becoming attaching to the fishline. For this reason, the fishline does not bring waterdrops inside the tubular member therewith, and thereby prevents waterdrops from becoming attaching to the interior surface of the tubular member. As a result, the fishline can be payed out and taken up smoothly.

DESCRIPTION OF THE PREFERRED EMBODIMENT

The following description of each aspect of the present invention is with reference to the accompanying drawings.

Figure 1:
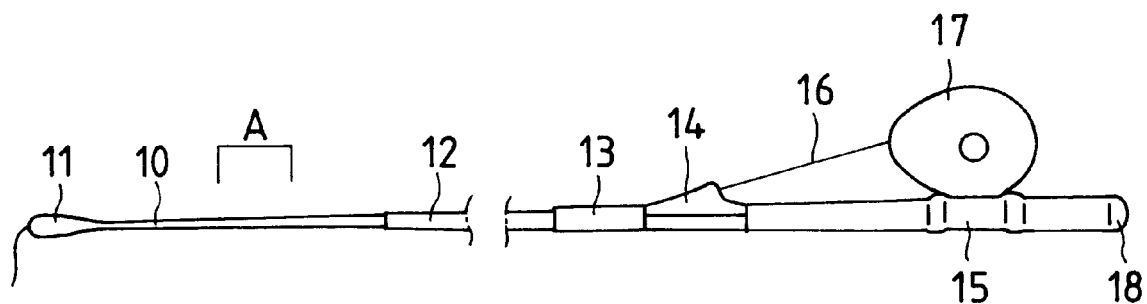
FIG. 1 is an elevation view of an intra-line fishing rod according to the present invention.

FIG. 1 shows a top rod 10 including a tip guide 11 at one end (the smaller diameter end) The other end (the larger diameter end) of the top rod 10 cooperatively attaches to the smaller diameter end of a middle rod 12. The larger diameter end of the middle rod 12 cooperatively attaches to the smaller diameter end of a base rod 13.

The base rod 13 includes a fishline insertion guide 14. The base rod 13 also includes a reel fixing device 15 which is disposed between the fishline insertion guide 14 and the larger diameter end of the base rod 13. A reel 17 supporting a spool of fishline 16 thereon is fixed by the reel fixing device 15 to the base rod 13. The base rod 13 further includes a rod bottom part 18 at the larger diameter end thereof.

The fishline 16 is inserted into the fishing rod through the fishline insertion guide 14 and exits the fishing rod from the tip guide 11.

Figure 2:
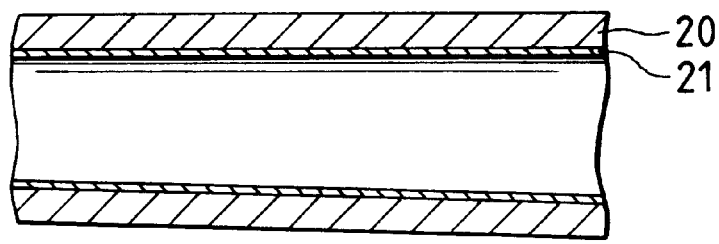
FIG. 2 is an enlarged cross-section view of the "A" portion of the fishing rod shown in FIG. 1.

FIG. 2 shows a tubular member 20 which is a portion "A" of the top rod 10. On the interior surface of the tubular member 20, there is formed a diffusion layer 21 which provides a diffusion property. The diffusion layer 21 can be formed with an aluminum layer on the interior surface of the tubular member which then receives an Alumirite treatment to oxidize the aluminum layer. The structure shown in FIG. 2 is not limited only to the top rod 10 but can also be incorporated in the middle rod 12 and the portions of the base rod 13 between the smaller diameter end and the fishline insertion guide 14.

The intra-line fishing rod according to the present invention provides a diffusion layer formed on the interior surface of the tubular member so that drops of water which have been carried inside the tubular member by the fishline are readily turned into a thin water film. Consequently, the cross-section area inside the tubular member is increased thereby allowing the fishline to extend therethrough without contacting the waterdrops. When the fishline passes through the central portion of the tubular member, the waterdrops are prevented from becoming attached to the fishline. Further, when the fishline contacts the interior surface of the tubular member, the fishline encounters a thin water film which offers minimal resistance (only the viscous resistance of water).

A fishline passing through a thin water film encounters less resistance than when the fishline passes through scattered waterdrops. The difference depends on the number of times the fishline passes through the interface (designated 33 in FIG. 3) between air and water. The fishline encounters resistance each time it passes through an interface between air and water. When many waterdrops are scattered across the interior surface, the number of times the fishline passes through an interface between air and water increases. Correspondingly, the resistance on the fishline is increased. On the other hand, when the fishline passes through a thin water film, the number of times the fishline passes through an interface between air and water is minimal, therefore the resistance to passage of the fishline is minimal.

The present invention allows the fishline to extend smoothly through the fishing rod, thereby improving the operation of the fishing rod.

Figure 3:
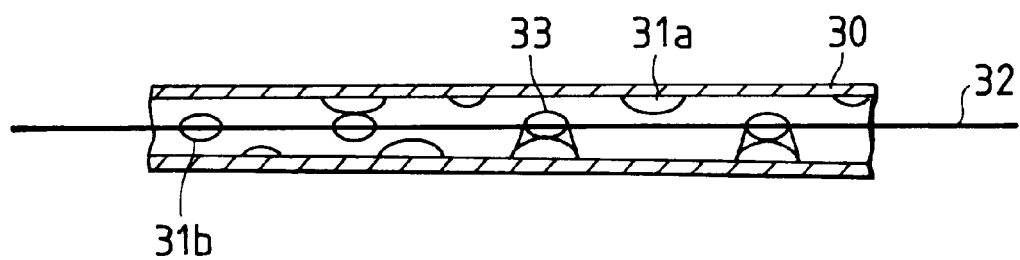
FIG. 3 illustrates the effect of resistance caused by contact between a fishline and waterdrops inside a tubular member.

Conventional Example:

A conventional intra-line fishing rod, i.e. without a diffusion layer according to the present invention, is shown in FIG. 3. A waterdrop 31a attached to the interior surface of a tubular member 30 and a waterdrop 31b attached to a fishline 32 are attracted to each other due to surface tension. When the fishline 32 is moved, the fishline 32 must also pull the waterdrops 31a,31b such that resistance to movement of the fishline 32 increases. The increased resistance to movement of the fishline causes a decrease in the ability to operate the fishing rod.

Figure 4:
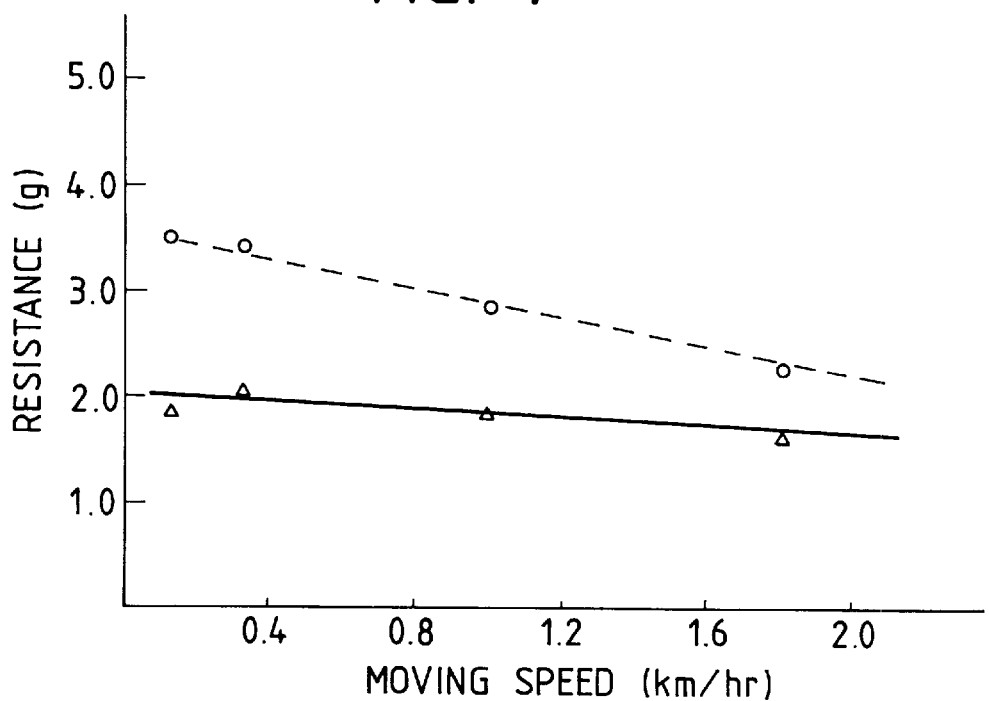
FIG. 4 is a graph showing a relationship between the moving speed of a fishline and resistance on the fishline.
Figure 5:
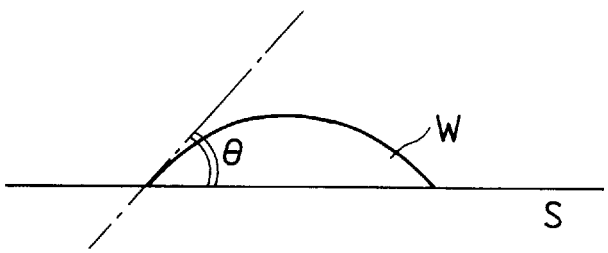
FIG. 5 illustrates the contact angle θ between a waterdrop W and a surface S.

FIG. 4 illustrates the comparative results of an intra-line fishing rod according to the present invention and the above conventional example. In particular, the relationship between moving speed of the fishline and resistance on the fishline (as measured with a tension meter) for each fishing rod is examined. The measured values shown in FIG. 4 are the mean values of five tests.

The intra-line fishing rod according to the present invention (plotted with triangles) demonstrates resistance on the fishline is substantially consistent and less than of the conventional example (plotted with circles) at all moving speeds of the fishline. The resistance on the fishline in the conventional example was especially greater at the slower moving speeds of the fishline, such as when the fishline is taken up or when dropping a light sinker (fishline terminal tackle) into the water.

FIG. 4 also indicates in both the present invention and the conventional example, that resistance on the fishline tends to decrease as the moving speed of the fishline increases. This is because as the moving speed of the fishline increases, the reactive forces to the forces which tend to impede movement of the fishline increase, and the resistance on the fishline decrease.

Figure 6:
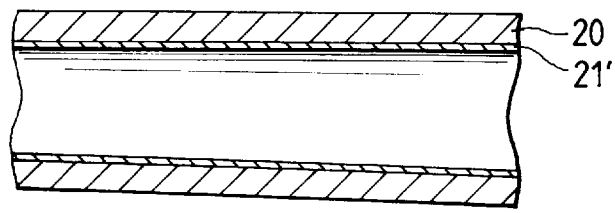
FIG. 6 is an enlarged cross-section view of another aspect of the present invention.

FIG. 6 is an enlarged section view of a portion of another embodiment of the present invention corresponding to the "A" portion of the top rod 10 shown in FIG. 1. A tubular member 20 has on its interior surface a super-repellent layer 21' which has a super-water-repellent property. The super-repellent layer 21' is formed according to a dispersed plating method in which nickel is used as a mother material and graphite fluoride particles are dispersed in the nickel to produce a plating solution. The structure shown in FIG. 6 is applicable not only to the top rod 10, but also to the middle rod 12 and the portions of the base rod 13 between the smaller diameter end and the fishline insertion guide 14. The super-repellent layer 21' causes drops of water to become balls or beads of water that are readily removed.

The intra-line fishing rod of the present invention having a super-repellant layer 21' formed on the interior surface of the tubular member 20, causes drops of water that have been brought inside the tubular member 20 by the fishline to be easily turned into balls or beads of water which are readily discharged from the tubular member 20. As a result, very few waterdrops remain inside the tubular member 20, thereby eliminating resistance caused by the waterdrops and allowing the fishline to be transported smoothly so as to improve operation of the fishing rod.

In the above-mentioned embodiments of the present invention, it has been assumed that the fishline 16 is formed of nylon having an outside diameter approximately 0.235 mm upon which no additional treatment has been applied. However, if the surface of the fishline is roughened by a chemical treatment using acid or alkali so as to create a diffusion property, or a super-repellent layer is formed on the fishline, then the fishline can be transported more smoothly through a fishing rod.

Also, the description of the aforementioned embodiments of the present invention has been given with reference to an intra-line fishing rod in which the tubular member is the body of the fishing rod itself. However, the advantages of the present invention can also be incorporated into tubular members serving as guides provided along the exterior surface of fishing rod. Essentially, the advantages of the present invention are equally applicable to all tubular members having a fishline extending therethrough. In addition, the diffusion layer or the super-repellent layer of the invention may be provided on an exterior surface of the fishing rod.

What is claimed is:

1. A fishing rod comprising:
   a hollow tubular member including an interior surface; and
   a repellent layer on said interior surface, said repellent layer comprising a metal material having fluoride particles dispersed therein,
   wherein said repellent layer reduces a frictional resistance when fishline is passing through said hollow tubular member.

2. A fishing rod as in claim 1, wherein said tubular member defines an interior passageway passing through a longitudinal interior of the fishing rod.

3. A fishing rod as in claim 1, wherein said tubular member is a guide provided on an exterior surface of the fishing rod.

4. A fishing rod as in claim 1, wherein said super-resilient layer forms a contact angle of 120° or more, said contact angle is between said interior surface and a line tangent to a peripheral surface of said water at a junction of said peripheral surface and said interior surface.

5. A fishing rod as in claim 1, wherein said metal material is chosen from a group consisting of nickel, nickel alloy, copper, copper alloy, tin, and tin alloy.

6. A fishing rod as in claim 1, wherein said fluoride particles are chosen from a group consisting of fluoride fibers, graphite fluoride particles, and polytetrafluoroethylene particles.

7. A fishing rod as in claim 1, wherein said fluoride particles have a mean molecular weight of about 8,000 to 10,000.

8. A fishing rod comprising:
   a hollow tubular member including an interior surface; and
   a repellent layer on said interior surface, said repellent layer defining a contact angle between a contact surface of said repellent layer and a line tangent to a peripheral surface of an amount of water disposed on said contact surface at a junction of said peripheral surface and said contact surface, wherein at least one of epoxy resin and acryl-urethane resin is mixed with fluorine particles having a thickness on the order of 1 $\mu$m or less to form said repellant layer which has a thickness of about 10 $\mu$m or less;
   wherein said contact angle is in the range of about 150° and 180°.

9. A fishing rod comprising,
   a hollow tubular member including an interior surface; and
   a repellent layer on said interior surface, said repellent layer comprising a mother material chosen from a group consisting of nickel, nickel alloy, copper, copper alloy, tin, and tin alloy, wherein fluorine particles are dispersed in said mother material to produce a plating solution, said fluorine particles comprising fluorine atoms defining more than about 20% of the total atoms existing in said repellent layer;
   wherein said repellent layer reduces a frictional resistance when fishline is passing through said hollow tubular member.

10. A fishing rod as in claim 9, wherein said fluorine particles are chosen from a group consisting of fluoride fibers, graphite fluoride particles, and polytetrafluoroethylene particles.

11. A fishing rod as in claim 9, wherein said fluorine particles have a mean molecular weight of about 8,000 to 10,000.

* * * * *